US011650916B2

United States Patent
Stephens et al.

(10) Patent No.: US 11,650,916 B2
(45) Date of Patent: May 16, 2023

(54) CLOSED LOOP GARBAGE COLLECTOR

(71) Applicant: Microsoft Technology Licensing, LLC, Redmond, WA (US)

(72) Inventors: Maoni Zhang Stephens, Kirkland, WA (US); Patrick H. Dussud, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 16/008,820

(22) Filed: Jun. 14, 2018

(65) Prior Publication Data
US 2019/0384705 A1 Dec. 19, 2019

(51) Int. Cl.
*G06F 12/02* (2006.01)
*G06F 3/06* (2006.01)
*G06F 12/06* (2006.01)

(52) U.S. Cl.
CPC ........ *G06F 12/0276* (2013.01); *G06F 3/0608* (2013.01); *G06F 3/0631* (2013.01); *G06F 3/0644* (2013.01); *G06F 3/0673* (2013.01); *G06F 12/0684* (2013.01); *G06F 2212/1044* (2013.01); *G06F 2212/7202* (2013.01); *G06F 2212/7205* (2013.01)

(58) Field of Classification Search
CPC ................................................. G06F 12/0276
USPC ........................................................ 707/815
See application file for complete search history.

(56) References Cited

U.S. PATENT DOCUMENTS

| 9,754,122 | B1* | 9/2017 | Christopher | ........ G06F 21/6218 |
| 2003/0200409 | A1* | 10/2003 | Sayag | ................. G06F 11/3466 |
| | | | | 711/170 |
| 2005/0149587 | A1* | 7/2005 | Bacon | ................. G06F 12/0253 |
| 2015/0127623 | A1 | 5/2015 | Gracie et al. | |
| 2019/0042406 | A1* | 2/2019 | Guniguntala | ....... G06F 11/3037 |

FOREIGN PATENT DOCUMENTS

WO 2011109191 A1 9/2011

OTHER PUBLICATIONS

"International Search Report & Written Opinion Issued in PCT Application No. PCT/US2019/033643", dated Jul. 19, 2019, 11 Pages.
"Office Action Issued in European Patent Application No. 19730060.1", dated Oct. 13, 2022, 7 Pages.
"Office Action Issued in Indian Patent Application No. 202017052733", dated Sep. 14, 2022, 8 Pages.

* cited by examiner

*Primary Examiner* — Syling Yen
(74) *Attorney, Agent, or Firm* — Workman Nydegger

(57) ABSTRACT

Systems and methods for garbage collection are disclosed. A garbage collection is triggered in a memory allocation based on a free list and selected amount of free space in an inner closed feedback loop. The free list is determined from a selected memory load and a current memory load as generated from the garbage collection in an outer feedback loop.

20 Claims, 4 Drawing Sheets

Fig. 2
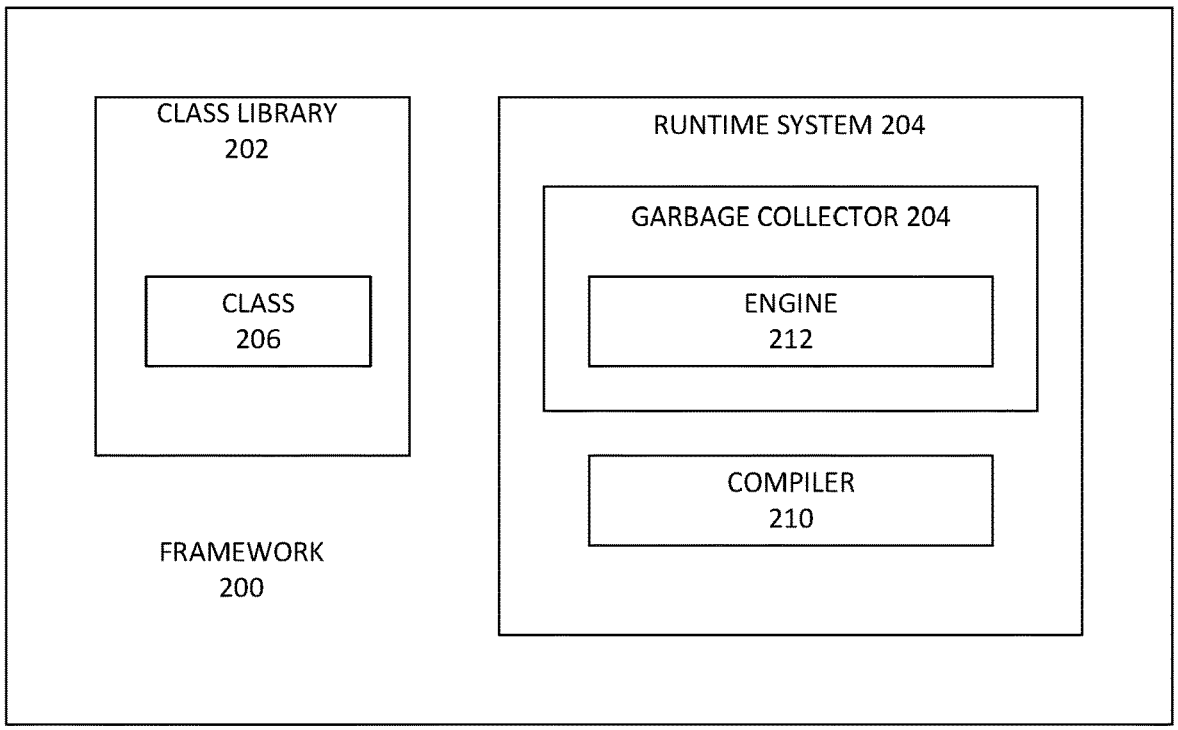
Fig. 3

CLOSED LOOP GARBAGE COLLECTOR

BACKGROUND

Garbage collection is a form of automatic memory management in computing systems. A garbage collector attempts to detect objects no longer used by software applications or programs on the computer system and to recover memory occupied by the objects that are no longer used by software applications or programs running on the computing system. In one example, garbage collection can be contrasted with manual memory management in which a programmer specifies the objects to de-allocate and return to the memory system. Memory management, including garbage collection, can influence performance of the software applications running on the computing device.

Many programming languages include garbage collection. In some programming languages, garbage collection can be included as part of the language specification such as C#, Java, D, Go, and many scripting languages. Additionally, some languages such as C and C++ are designed for manual memory management but include garbage-collected implementations. Further, some languages such as C++ for Common Language Infrastructure (C++/CLI) allow for both garbage collection and manual memory management to co-exist in the same application by using separate memory segments for collected and manually managed objects. Garbage collection is often integrated into the language compiler and the runtime system.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Systems and methods that apply garbage collection to control a selected amount of memory load and maintain a selected amount of a free list are disclosed. Systems often specify working set limits of available memory to run applications, which can include working set limits on heap size and on software containers. To maintain a specified memory load, the amount of available memory can be adjusted based on how garbage collection is being used. While memory load is maintained, an amount of free list is determined. A closed loop feedback control can be applied to determine a virtual free space. Rather than materializing the virtual free space, it is provided to a closed loop feedback control to determine an amount of free list. This provides the flexibility to control physical memory load without having to bring objects into physical memory. The input to the closed feedback loop is an error from a goal such as an actual amount versus a set point or goal amount. In one example, garbage collection is triggered in a memory allocation based on a free list and selected amount of free space in an inner closed feedback loop. The free list is determined from a selected memory load and a current memory load as generated from the garbage collection in an outer feedback loop. In one example, the outer feedback loop includes a multi-term controller having a proportional term and an integral term. The free list can be distributed between multiple garbage collection generations in a multiple memory allocations. The outer loop provides an output of a virtual free space list. The inner loop provides an output of an allocation that determines when the next garbage collection is triggered. The garbage collection can be triggered based on an amount of allocation that can be performed on a generation, which is calculated based on the virtual free space provided from the outer loop.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

FIG. 2 is a block diagram illustrating an example application framework for execution in the computing device of FIG. 1.

FIG. 3 is a block diagram illustrating an example method of the garbage collector of FIG. 2.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
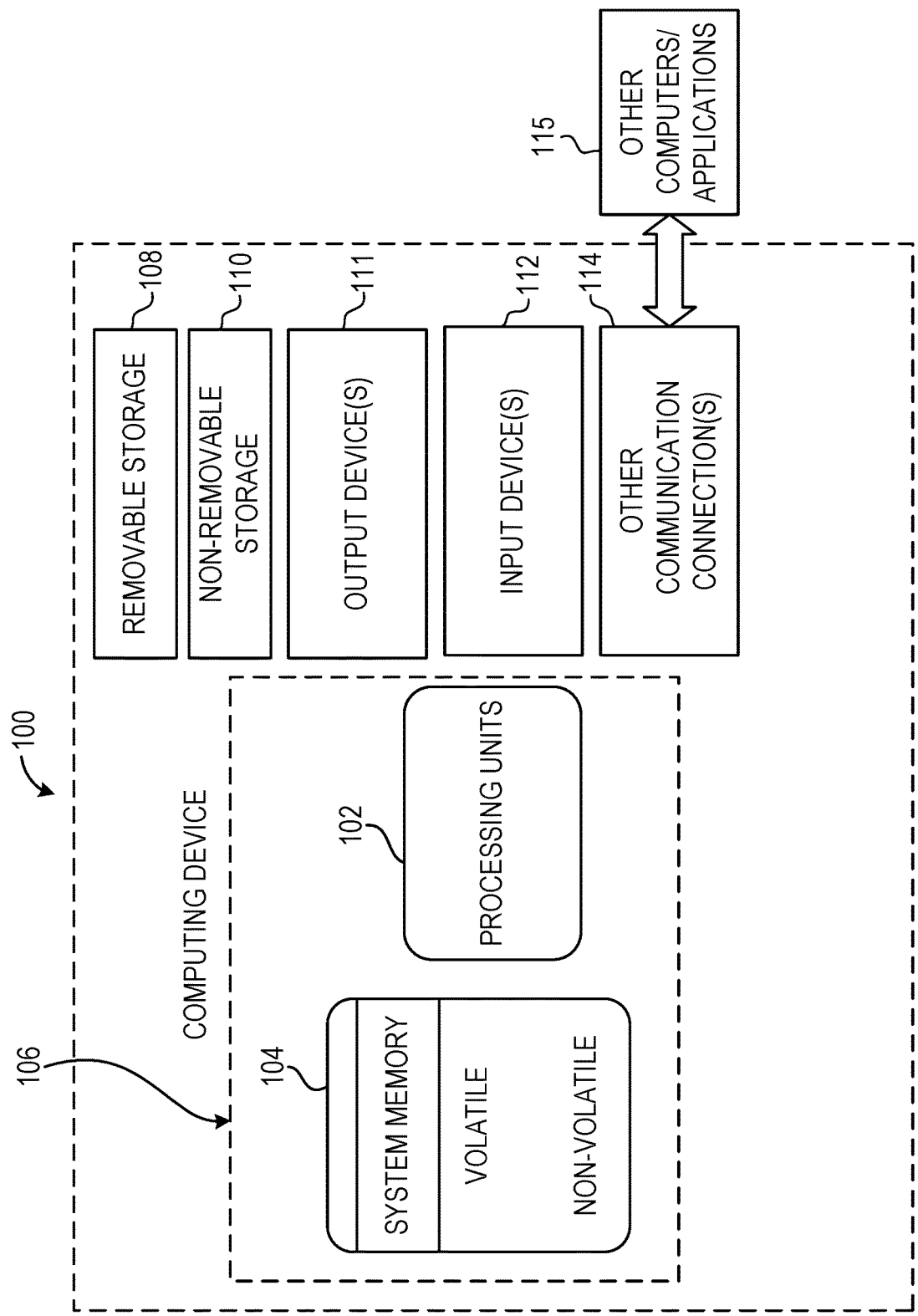
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. An example of a computer-implemented process includes a concurrent garbage collection that can be stored in a computer memory and executed with a processor to be triggered based on a dynamically tunable parameter based on a previous garbage collection.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread. Threads can communicate with each other during processing through techniques such as message passing.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

The present disclosure relates generally to garbage collectors and methods to provide garbage collection, such as concurrent garbage collection, used with programming languages or runtime systems in a data processing system such as computing device 100. Aspects of the present disclosure may be embodied as a system, method or computer program product. Accordingly, aspects of the present disclosure may take the form of entirely hardware, entirely software, including firmware, resident software, micro-code, or a combination of software and hardware aspects that may all generally be referred to as a system. Furthermore, aspects of the present disclosure may take the form of a computer program product including one or more computer readable medium or media having computer readable program instruction for causing a processor to carry out the aspects of the disclosure.

FIG. 2 illustrates features of an example software framework 200, which can be implemented on computing device 100. The framework 200 can be used with developer-written software applications created in one or more framework-compatible languages for one or more platforms. Example framework 200 includes a class library 202 having a runtime library and base class library and an application engine such as a runtime system 204, virtual machine, or software container. In one example, the class library 202 includes a set of classes organized by namespace to define features available in a framework-compatible programming language. Software applications written in a framework-compatible language as source code are compiled into a platform-neutral language, or bytecode, that can be executed in a platform-specific virtual machine installed on the platform, such as computing device 100. The runtime system 204 compiles the bytecode into machine code that is executed on the platform. The runtime system 204 can provides additional services including memory management, type safety, exception handling, garbage collection, security and thread management. Upon execution of the developer-written program, a platform-specific just-in-time compiler 210 of the runtime system 204 translates the byte code into machine code. The compiler 210 can provide a combination of ahead-of-time compilation and interpretation, and the runtime system 204 can handle late-bound data types and enforce security guarantees.

Class library 202 of the example can include one or more class or classes 206 implemented in accordance with the methods disclosed. In general, a class 206 is an extensible program-code-template, or blueprint, for creating objects, providing initial values for state, and implementations of behavior. The class is a construct that enables a developer to create custom types by grouping together variables of other types, methods and events. Class or classes 206 may include class variables, instance variables, local variables, parameters, user-defined methods, inherited states and behaviors, and interfaces. The variable can remain in memory 104 until all references go out of scope. At that time, the runtime system 204 via garbage collector 208 can mark the variable as eligible for garbage collection.

Garbage collector 208 automatically manages the allocation and release of memory for the application. The runtime system 204 allocates a segment of memory 104 to store and manage objects. In one example, the segment of memory is called the managed heap. (The managed heap is distinguishable from a native heap in the operating system. For the purposes of this disclosure, "heap" refers to the managed heap.) For each new object, the runtime system 204 allocates memory for the object from the segment of memory. In one example, there can be a managed heap for each managed process, and threads in the process allocate memory for objects on the same heap. In another example, the heap can be an accumulation of a large object heap, such as a heap that includes objects over a selected threshold in size, and a small object heap. The heap can include any number of noncontiguous chunks virtual memory, each including live blocks with objects interspersed with regions of free memory, or free space. The runtime system 204 maintains a free list data structure, or physical free list, that indexes all of the free memory that it has allocated, and uses it to satisfy allocation requests.

In addition to the free memory that has been allocated, the runtime system 204 can maintain a virtual free list of all the memory available for the heap. For example, the runtime system 204 can specify an amount of a subset of the memory 104 to use for the heap, or memory load. This can be specified as an amount of memory less than or equal to the amount of memory 104, as a percentage of the amount of memory 104, or some other limit on memory 104. The runtime system 204 can allocate into the virtual free list to expand the physical free list.

As address space becomes occupied on the segment of memory, the garbage collector 208 eventually frees some memory. The garbage collector 208 includes an optimizing engine 212 to determine the preferred time or occasion to perform a collection. The garbage collector 208 checks for objects in the segment of memory that are no longer being used by the application and performs the operations to reclaim the memory. Garbage collection can occur when the system has low physical memory or if the memory used by allocated objects on the segment of memory surpasses an acceptable threshold.

In one example, the managed memory can be generational. The memory can be organized into multiple generations to provide for long-lived and short-lived objects. Garbage collection primarily occurs with the reclamation of short-lived objects that typically occupy a small part of the segment of memory. One example includes three generations of objects on the heap including a generation 0, generation 1, and generation 2. Generation 0 is the youngest generation and contains short-lived objects such as a temporary variable. Garbage collection occurs most frequently in this generation. ☐ In one example, newly allocated objects form a new generation of objects and are implicitly generation 0 collections, unless they are large objects, in which case they go on the large object heap in a generation 2 collection. ☐ Many objects are reclaimed for garbage collection in generation 0 and do not survive to the next generation. Generation 1 includes short-lived objects and can serves as a buffer between short-lived objects and long-lived objects. Some example garbage collectors do not include a generation 1 heap and only include heaps for short-lived and long-lived objects. Additionally, one or more generations of short-lived objects can be known as ephemeral generations. Generation 2 includes long-lived objects. An example of a long-lived object is an object in a server application that contains static data that is live for the duration of the process. Garbage collections occur on specific generations as conditions warrant. Collecting a generation means collecting objects in that generation and all its younger generations. A generation 2 garbage collection is typically a full garbage collection because it reclaims all objects in all generations of the managed heap. Objects that are not reclaimed in a garbage collection are known as survivors and are promoted to the next generation. For example, objects that survive a generation 0 garbage collection are promoted to generation 1, objects that survive a generation 1 garbage collection are promoted to generation 2, and objects that survive a generation 2 garbage collection remain in generation 2.

Before a garbage collection starts, or is triggered, the managed threads can be suspended except for the thread that triggered the garbage collection. The garbage collector can determine whether an object is live via information such as stack variables provided by a just-in-time compiler and stack walker, handles that point to managed objects and that can be allocated by user code or by the runtime, and from static objects in application domains that could be referencing other objects. Each application domain tracks its static objects. In one example, garbage collection can occur in a set of phases including marking phase that finds and creates a list of all live objects, a relocating phase that updates the references to the objects that will be compacted, and a compacting phase that reclaims the space occupied by the dead objects and compacts the surviving objects. The compacting phase moves objects that have survived a garbage collection toward the older end of the segment of memory. In one example, garbage collector 208 can be a mark and sweep collector that can find and create a list of all live objects, update references to objects that occupy memory to be compacted, reclaim address space occupied by dead objects, and compact surviving objects.

Concurrent garbage collection is a form of garbage collection that enables threads to run concurrently with a dedicated thread that performs the garbage collection for at least some of the duration of the dedicated thread that performs the garbage collection. For example, a concurrent garbage collection can run in the dedicated thread while one or more mutator threads are running, i.e., a thread that mutates the managed heap. Concurrent garbage collection can be performed on generational and non-generational heaps. In one example, concurrent garbage collection affects garbage collections for long-lived objects such as generation 2. For example, garbage collection in generation 0 and generation 1 are performed non-concurrently because they can be completed quickly and not noticeably affect performance.

Garbage collector 208 attempts to improve performance via preferred triggering of the collection with optimizing engine 212. Garbage collector in general presents a performance overhead, and running too often or when not preferred can adversely affects performance of the concurrently running programs. If the collection is triggered to early, the free memory space has not been efficiently used and performance of the concurrently running programs is adversely affected. If the collection is triggered too late and the managed heap runs out of memory space, the generational size of the managed heap may need to be extended which is adversely affects the performance of non-compacting garbage collectors. Performance of compacting concurrent garbage collectors can suffer as well as mutator threads may have to wait for more memory space to become available.

Garbage collection can be affected by unpredictable factors such as operating system thread scheduling and sudden changes in application behavior as well as other factors. Due to the non-deterministic nature of these factors, predicting the pace of building free memory space and consuming the free memory space is difficult. Thus, triggering garbage collection from a statically preconfigured amount of free memory space left available in the managed heap is generally inefficient and can run the risk of either running out of free space, and having to acquire more memory from the operating system, or not utilizing the free space built up from a previous garbage collection.

FIG. 3 illustrates an example method 300 for use with the garbage collector 208, such as in optimizing engine 212, of software framework 200 to use virtual free space to control heap size with closed-loop feedback control. In one example, a garbage collection is triggered in a memory allocation based on a free list and a selected amount of free space in an inner closed feedback loop at 302. The free list is determined based on a selected memory load and a current memory load generated from the garbage collection in an outer closed feedback loop at 304. The memory load can be based on the available memory for the applications, such as amount of physical memory available for the heap size or software container size. For example, if computing device 100 includes 10 gigabytes of memory 104, a system could specify that 70% of the memory 104 is available as a memory load, or 7 Gigabytes. The current memory load is the amount of currently available physical memory, which can be less than memory load. The system can specify the memory load, or memory limit, via an application programming interface, or other mechanism to limit heap size or container size. In one example, the free list is a virtual free list or available space in the memory 104. The free space includes allocated memory that is not being used, and the selected amount of free space includes a specified amount of free space that the runtime system attempts to maintain.

Figure 4:
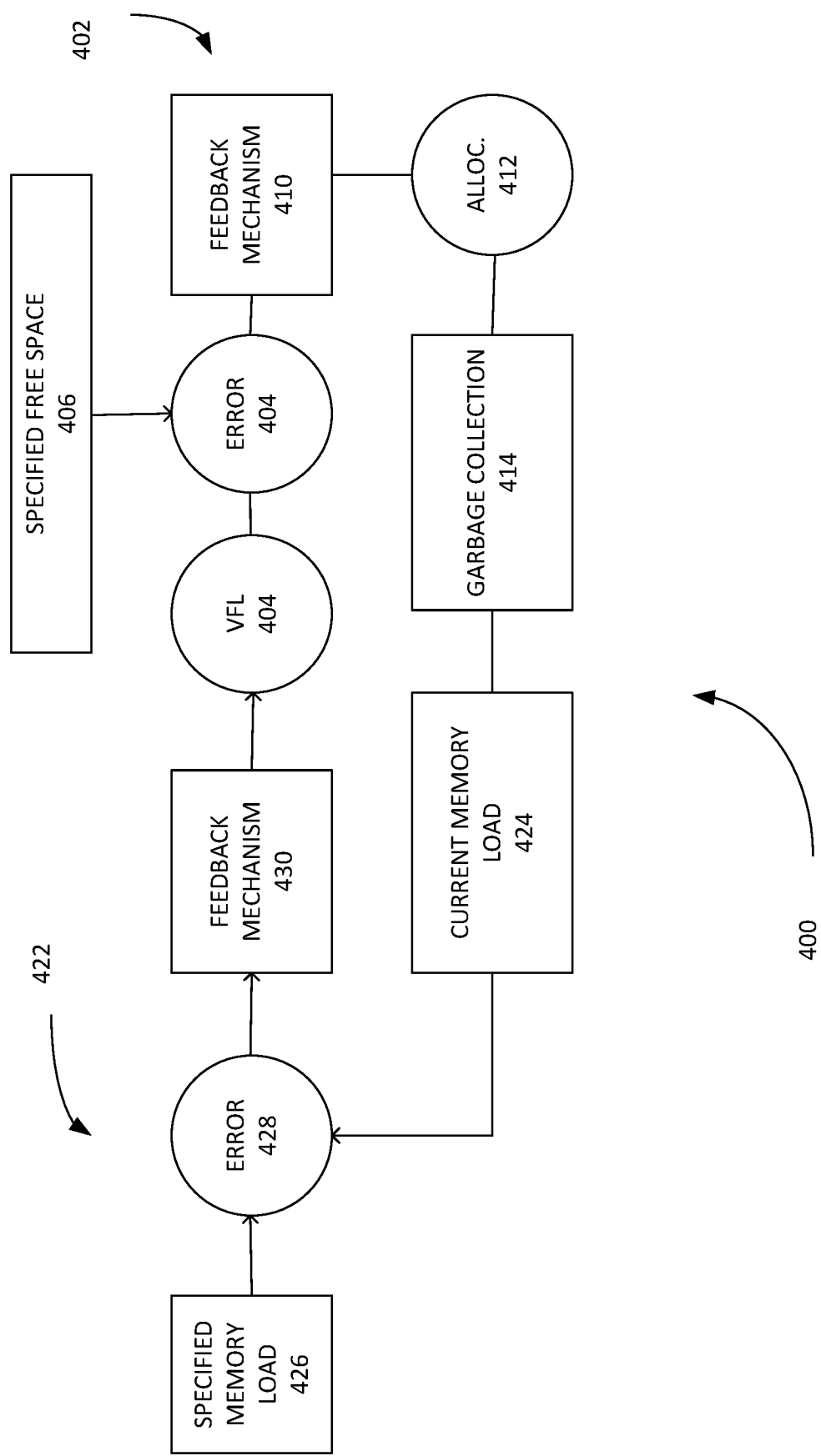
FIG. 4 is a block diagram illustrating an example system in accordance with the method of FIG. 3.

FIG. 4 illustrates an example of a system 400 to implement method 300 in the software framework 200. An inner closed feedback loop 402 receives a free list 404, such as a virtual free list of available memory that can be allocated up to the memory load, and a specified amount of free space 406, such as a user specified amount of free space that may be intended as a user specified goal of free space, at a inner error input 408. In one example the virtual free list 404 and the free space 406 are provided as ratios, such as a percentage of memory or the heap or a ratio of free memory space to available memory space on the heap. In another example, the amount of free space can be a number of bytes of free memory. The inner error input 408 is the difference between the virtual free list 404 and the free space 406, which can be processed with an inner feedback mechanism 410, which may include a multi-term controller. A first output 412 can include an amount of memory that will be consumed in the free space by other generation allocations before the next garbage collection 414 is triggered. The output can be extended to any other kinds of factors that will denote the triggering of the next garbage collection 414, such as the number of younger generations garbage collections that will be performed before the next garbage collection 414 is triggered.

After a garbage collection 414 is complete, an outer closed feedback loop 422 receives a current memory load 424, such as a currently available amount of physical memory, and a specified amount of memory load 426, such as a user specified amount of memory load that may be intended as a user specified goal of memory load, at the outer error input 428. In one example the current memory load 424 and the specified amount of memory load 426 are provided as ratios, such as a percentage of all memory 104. In another example, the amount of free space can be a number of bytes of a subset of memory 104. The inner error input 428 can determine a difference between the current memory load 424 and the specified memory load 426, which can be processed with the outer feedback mechanism 430, which may include a multi-term controller. The outer feedback mechanism provides an output, which is the free list 404.

The inputs to the closed feedback loops 402, 422 is an error 408, 428 from a goal such as an actual amount versus a set point or goal amount. The outer loop 428 provides an output 404 of a virtual free space list. The inner loop 402 provides an output 412 of an allocation that determines when the next garbage collection is triggered. The garbage collection 414 can be triggered based on an amount of allocation that can be performed on a generation, which is calculated based on the virtual free space provided from the outer loop 428.

An example of a multi-term controller of the inner and outer feedback mechanisms 410, 430 can include a type of proportional-integral-derivative controller (PID controller). A multi-term controller calculates an error value as the difference between a desired setpoint, such as a selected memory load or selected free space, and a measured process variable, such as the current memory load and the virtual free space, respectively, and applies a correction based on at least one of proportional, integral, and derivative terms to automatically apply accurate and responsive correction to a control function. In one example, the multi-term controller can be implemented as a process having proportional and integral terms. The derivative term may be missing in one example. For example, a proportional term can include accounting for present values of error from a set point, or goal. If the error is large and positive, the output will also be large and positive. An integral term can include accounting for past values of the error. If the current output is not sufficiently strong, for example, the integral term of error will accumulate over time, and the optimizing engine 212 will respond by applying a stronger action. A derivative term, if applied, can account for possible future trends of the error and can be based on a current rate of change.

In one example, the outputs 404, 412 of the inner and outer feedback mechanisms 410, 430 can be a based on a sum of the terms of the multi-term controller. In the outer feedback loop 422, for instance, the proportional term can include the error as determined from the outer error input 428 multiplied by a constant, such as ml_ki*error. Also in the outer feedback loop 422, the integral term can also multiply the error from the outer error input 428 by a constant, such as ml_ki*error to obtain an integral error amount error_ki, and then add the integral error amount to an accumulated error, or accu_error, such as accu_error+=error_ki. The accumulated error is based on current memory loads 424 and the memory load setpoint value 426. The proportional term and the integral term can be added together to return a total virtual free list size, which can be provided to output 404 as $$total\_virtual\_fl\_size=ml\_kp*error+accu\_error$$

Various multi-term techniques to avoid overly large changes, such as anti-windup can be applied to the integral term or otherwise.

To initialize the system 400, the optimizing engine 212 can apply parameters initially configured by the runtime system 200. In one example, a user may further configure or selectively adjust the parameters. For instance, a memory load can be selected as 70% and a free space goal can be selected to include 15% of the heap size. The initial trigger can be done via other mechanisms as triggering a garbage collection when every 5% of the memory is consumed to establish enough garbage collections to exhibit a pattern or history.

Figure 5:
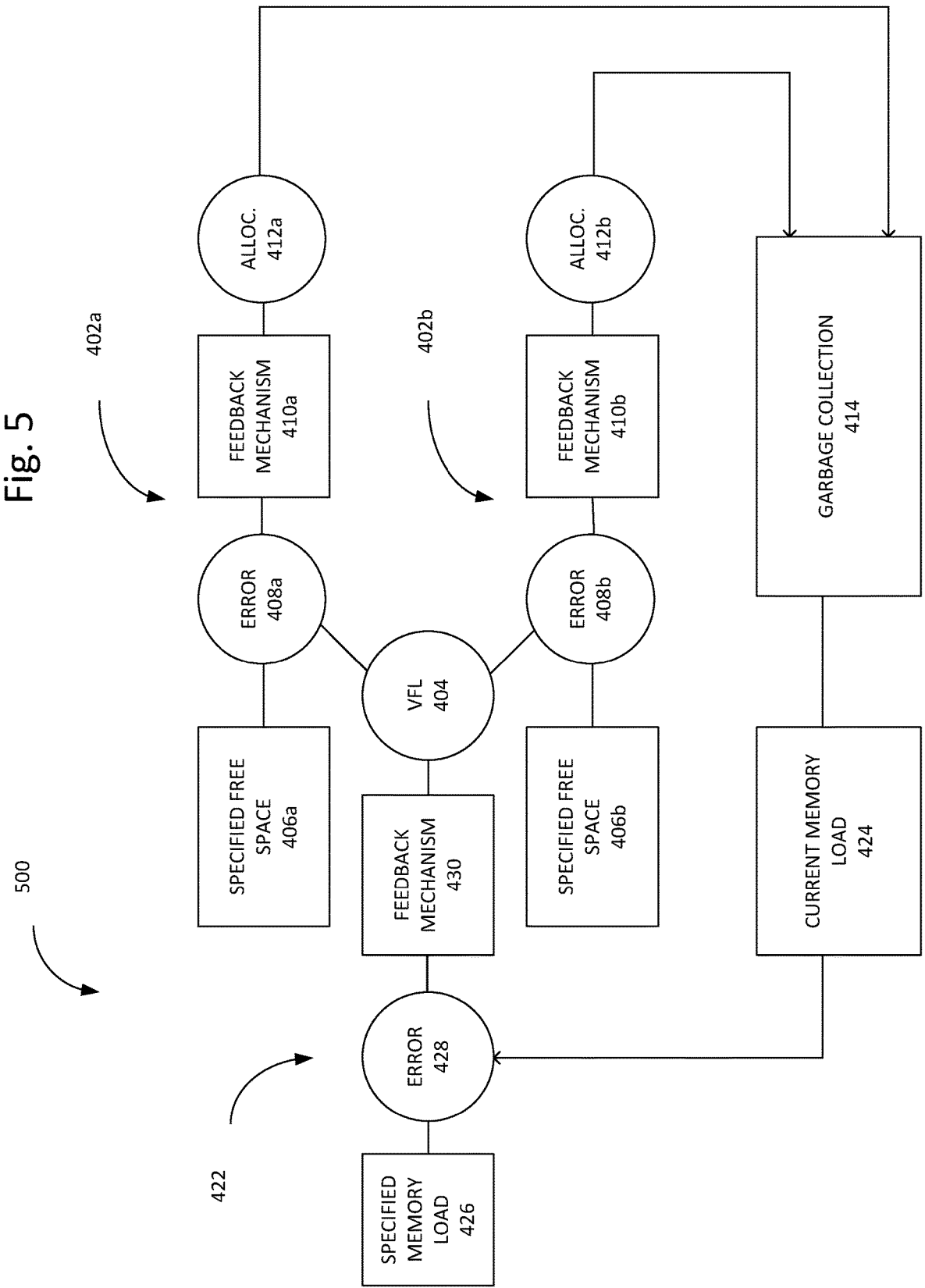
FIG. 5 is a block diagram illustrating an example system of multi-generational garbage collector in accordance with the method of FIG. 3.

FIG. 5 illustrates an example system 500 to implement method 300 in the software framework 200, in which like features of system 400 are label with like reference numbers, but the virtual free list from free list 404 is distributed in a plurality of generations and triggered by a plurality of inner closed feedback loops such as first generation inner closed feedback loop 402a and second generation inner closed feedback loop 402b. The descriptions of first and second generations are intended for illustration, and may not correspond with a generation 0 and generation 1 or generation 1 and generation 2 of the garbage collector 208.

In the example, the first generation inner closed feedback loop 402a receives the free list 404 assigned to the first generation, or first generation virtual free list, and a first specified amount of free space 406a for the first generation, such as a user specified amount of free space that may be intended as a user specified goal of free space in the first generation, at an error input 408a. The first generation free list may be a percentage of the total free list and provided as a ratio. The inner error input 408a can determine a difference between the first generation virtual free list 404 and the first specified free space 406a, which can be processed with a inner feedback mechanism 410a, such as the multi-term controller. A first generation output 412a can include an amount of memory that will be consumed in the free space by the generation allocation before the next garbage collection 414 is triggered.

The second generation inner closed feedback loop 402b receives the free list 404 assigned to the second generation, or second generation virtual free list, and a second specified amount of free space 406b for the second generation, such as a user specified amount of free space that may be intended as a user specified goal of free space in the second generation, at an error input 408b. The second generation free list may be a percentage of the total free list and provided as a ratio, and, in the case of two generations, can be equal to 1—the first generation free list. The second specified free space 406b can be the same or different than the first specified free space 406a for the first generation. The error input 408b can determine a difference between the second generation virtual free list 404 and the second specified free space 406b, which can be processed with a second generation feedback mechanism 410b, such as a multi-term controller. A second generation output 412b can include an amount of memory that will be consumed in the free space by the generation allocation before the next garbage collection 414 is triggered.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of iteratively triggering and performing garbage collection in a computing device, comprising:
triggering a garbage collection of a series of garbage collections in a memory allocation in the computing device based on an allocation indicating an amount of memory consumed in free space in order to trigger the garbage collection,
wherein the allocation indicating the amount of memory consumed is the output of an inner feedback mechanism including an inner multiterm controller which takes as input an inner error computed from a virtual free list and a specified amount of free space,
wherein the virtual free list is the output of an outer feedback mechanism including an outer multiterm controller which takes as input an outer error computed from a selected memory load of an amount of physical memory available for an application and a current memory load of available physical memory for the application, the current memory load determined from an immediately previous garbage collection; and subsequent to completion of the garbage collection,
determining a next current memory load such that a next outer error is determined from the next current memory load and the selected memory load;
computing a next virtual free list by the outer feedback mechanism;
determining a next inner error from the next virtual free list and the specified amount of free space;
determining by the inner feedback mechanism a next allocation indicating a next amount of memory consumed in free space in order to trigger a next garbage collection; and
triggering the next garbage collection based on the next amount of memory consumed.

2. The method of claim 1 wherein the selected memory load is based on memory load ratio.

3. The method of claim 1 wherein the selected memory load is based on heap size.

4. The method of claim 1 wherein the selected memory load is based on a container limit.

5. The method of claim 1 wherein the free list is distributed between a plurality of generations.

6. The method of 5 wherein the plurality of generations includes a first generation and a second generation, wherein the second generation is garbage collected less frequently than the first generation.

7. The method of claim 5 wherein the free list is distributed in a plurality of memory allocations.

8. The method of claim 5 wherein the selected amount of free space includes a plurality of selected amounts of free space.

9. The method of claim 1 wherein the outer feedback mechanism includes a proportional term and an integral term.

10. A system to reclaim memory, comprising:
a memory device to store a set of instructions; and
a processor to execute the set of instructions to:
trigger a garbage collection of a series of garbage collections in a memory allocation based on an allocation indicating an amount of memory consumed in free space in order to trigger the garbage collection,
wherein the allocation indicating the amount of memory consumed is the output of an inner feedback mechanism including an inner multiterm controller which takes as input an inner error computed from a virtual free list and a specified amount of free space,
subsequent to completion of the initial garbage collection,
determine a next current memory load such that a next outer error is determined from the next current memory load and the selected memory load;
compute a next virtual free list by the outer feedback mechanism;
determine a next inner error from the next virtual free list and the specified amount of free space;
determine by the inner feedback mechanism a next allocation indicating a next amount of memory consumed in free space in order to trigger a next garbage collection; and
trigger the next garbage collection based on the next amount of memory consumed.

11. The system of claim 10 wherein the outer feedback mechanism receives an error amount based on a difference of the selected memory load and the current memory load.

12. The system of claim 11 wherein the outer feedback mechanism includes a proportional term and an integral term.

13. The system of claim 12 wherein the integral term is based on an accumulated error of a previous current memory load.

14. The system of claim 13 wherein the free lists are determined from the accumulated error and the error.

15. The system of claim 10 wherein the free lists are distributed between a plurality of garbage collection generations in a plurality of memory allocations.

16. The system of claim 15 wherein each of the plurality of garbage collection generations includes an inner feedback mechanism that receives an error amount based on a difference of the free lists and the selected amount of free space.

17. The system of claim 16 wherein the inner multiterm controller includes a proportional term and an integral term.

18. A computer readable device to store computer readable instructions to control a processor to control garbage collection, the instructions comprising:
trigger a garbage collection of a series of garbage collections in a memory allocation based on an allocation indicating an amount of memory consumed in free space in order to trigger the garbage collection,
wherein the allocation indicating the amount of memory consumed is the output of an inner feedback mechanism including an inner multiterm controller which takes as input an inner error computed from a virtual free list and a specified amount of free space,
subsequent to completion of the initial garbage collection,
determine a next current memory load such that a next outer error is determined from the next current memory load and the selected memory load;
compute a next virtual free list by the outer feedback mechanism;
determine a next inner error from the next virtual free list and the specified amount of free space;
determine by the inner feedback mechanism a next allocation indicating a next amount of memory consumed in free space in order to trigger a next garbage collection; and
trigger the next garbage collection based on the next amount of memory consumed.

19. The computer readable device of claim 18 wherein the outer multiterm controller having a proportional term and an integral term.

20. The computer readable device of claim 19 wherein the initial free list is distributed between a plurality of garbage collection generations in a plurality of memory allocations.

* * * * *